(12) United States Patent
Seok

(10) Patent No.: US 12,541,462 B2
(45) Date of Patent: Feb. 3, 2026

(54) STORAGE DEVICE FOR MAINTAINING PREFETCH DATA, ELECTRONIC DEVICE INCLUDING THE SAME, AND OPERATING METHOD THEREOF

(71) Applicant: SK hynix Inc., Gyeonggi-do (KR)

(72) Inventor: Ji Hoon Seok, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 211 days.

(21) Appl. No.: 18/075,630

(22) Filed: Dec. 6, 2022

(65) Prior Publication Data

US 2024/0045806 A1 Feb. 8, 2024

(30) Foreign Application Priority Data

Jul. 29, 2022 (KR) .................. 10-2022-0094883

(51) Int. Cl.
*G06F 12/10* (2016.01)
(52) U.S. Cl.
CPC ...... *G06F 12/10* (2013.01); *G06F 2212/1016* (2013.01); *G06F 2212/2022* (2013.01); *G06F 2212/654* (2013.01)
(58) Field of Classification Search
CPC .......... G06F 12/0862; G06F 2212/602; G06F 2212/6028; G06F 12/0246; G06F 2212/7201; G06F 12/1027; G06F 9/30047; G06F 2212/6026; G06F 2212/654; G06F 12/10; G06F 2212/6022; G06F 12/0215
USPC ........... 711/202, 137, 12.057, 154, 206, 204, 711/12.008
See application file for complete search history.

(56) References Cited

U.S. PATENT DOCUMENTS

| 8,849,942 B1* | 9/2014 | Foster ................. G06F 12/0862 709/213 |
| 10,530,887 B1* | 1/2020 | Mehr ................. H04L 67/5681 |

(Continued)

FOREIGN PATENT DOCUMENTS

| KR | 10-2020-0022179 A | 3/2020 |
| KR | 10-2020-0143871 A | 12/2020 |

OTHER PUBLICATIONS

JEDEC, Universal Flash Storage (UFS) Host Performance Booster(HPB) Extension, Version 1.0, JESD220-3, Jan. 2020, pp. 1-24, JEDEC Solid State Technology Association.

(Continued)

*Primary Examiner* — Jared I Rutz
*Assistant Examiner* — Edward Waddy, Jr.
(74) *Attorney, Agent, or Firm* — IP & T GROUP LLP

(57) ABSTRACT

A storage device includes: a nonvolatile memory device; a volatile memory device including: a map data storage for temporarily storing a part of map data representing a relationship between a logical address of data, provided from a host device, and a physical address corresponding to a position in the nonvolatile memory device in which the data is stored; and a prefetch data storage for storing, as prefetch data, map data about at least two logical addresses prefetched from the host device; and a memory controller for controlling the nonvolatile memory device and the volatile memory device to process a multi-chunk read command as a read request for the at least two logical addresses received from the host device by using the prefetch data, and maintain the prefetch data in the prefetch data storage.

20 Claims, 10 Drawing Sheets

(56) References Cited

U.S. PATENT DOCUMENTS

| | | | |
|---|---|---|---|
| 2007/0005904 A1* | 1/2007 | Lemoal | G06F 3/0676 |
| | | | 711/137 |
| 2011/0093687 A1* | 4/2011 | Chen | G06F 12/0862 |
| | | | 712/225 |
| 2015/0074328 A1* | 3/2015 | Baryudin | G06F 3/0616 |
| | | | 711/103 |
| 2017/0024322 A1* | 1/2017 | Pan | G06F 12/0868 |
| 2017/0123988 A1* | 5/2017 | Chun | G06F 12/0246 |
| 2019/0205256 A1* | 7/2019 | Byun | G06F 12/10 |
| 2019/0303299 A1* | 10/2019 | Su | G06F 3/0679 |
| 2020/0142621 A1* | 5/2020 | Bae | G06F 12/0246 |
| 2020/0242037 A1* | 7/2020 | Navon | G06F 9/3832 |
| 2020/0409597 A1* | 12/2020 | Ganesh | G06F 3/0659 |

OTHER PUBLICATIONS

JEDEC, Universal Flash Storage (UFS) Host Performance Booster(HPB) Extension, Version 2.0, JESD220-3A (Revision of JESD 220-3, Jan. 2020), Sep. 2020, pp. 1-32, JEDEC Solid State Technology Association.

* cited by examiner

STORAGE DEVICE FOR MAINTAINING PREFETCH DATA, ELECTRONIC DEVICE INCLUDING THE SAME, AND OPERATING METHOD THEREOF

CROSS-REFERENCE TO RELATED APPLICATION

The present application claims priority under 35 U.S.C. § 119(a) to Korean patent application number 10-2022-0094883, filed on Jul. 29, 2022, the entire disclosure of which is incorporated herein by reference.

BACKGROUND

1. Field of Invention

Various embodiments of the present disclosure generally relate to an electronic device, and more particularly, to a storage device, an electronic device including the same, and an operating method thereof.

2. Description of Related Art

A storage device is a device which stores data under the control of a host device such as a computer or a smart phone. The storage device may include a memory device for storing data and a memory controller for controlling the memory device. The memory device is classified into a volatile memory device and a nonvolatile memory device.

The volatile memory device is a memory device in which data is stored only when power is supplied, and stored data disappears when the supply of power is interrupted. The volatile memory device may include a Static Random Access Memory (SRAM), a Dynamic Random Access Memory (DRAM), and the like.

The nonvolatile memory device is a memory device in which data does not disappear even when the supply of power is interrupted. The nonvolatile memory device may include a Read Only Memory (ROM), a Programmable ROM (PROM), an Electrically Programmable ROM (EPROM), an Electrically Erasable ROM (EEROM), a flash memory, and the like.

As a technique for improving the performance of storage devices, there is a Host Performance Booster (HPB) mode. When a computing system including a storage device and a host is operated in the HPB mode, both a host buffer included in the host and a buffer memory of the storage device may be used.

SUMMARY

Various embodiments of the present disclosure provide a storage device for efficiently using prefetch data stored in a prefetch data storage, an electronic device including the storage device, and an operating method of the electronic device.

In accordance with an aspect of the present disclosure, there is provided a storage device including: a nonvolatile memory device; a volatile memory device including: a map data storage configured to temporarily store a part of map data representing a relationship between a logical address of data, provided from a host device, and a physical address corresponding to a position in the nonvolatile memory device in which the data provided from the host device is stored; and a prefetch data storage configured to store, as prefetch data map data about at least two logical addresses prefetched from the host device; and a memory controller configured to control the nonvolatile memory device and the volatile memory device to process a multi-chunk read command as a read request for the at least two logical addresses received from the host device by using the prefetch data, and maintain the prefetch data in the prefetch data storage.

In accordance with another aspect of the present disclosure, there is provided a host device for controlling a storage device, the host device including: a host buffer configured to store map data representing a relationship between a logical address of data stored in the storage device and a physical address corresponding to a position in a nonvolatile memory device of the storage device in which the data is stored, the map data being provided from the storage device; and a storage device controller configured: to transmit, to the storage device, as prefetch data, map data about at least two logical addresses among the map data stored in the host buffer, transmit, to the storage device, a multi-chunk read command which is a read request for the at least two logical addresses, and receive, from the storage device, a response message including information representing whether the storage device has processed the multi-chunk read command by using the prefetch data transmitted to the storage device and stored in a volatile memory device of the storage device or without using the transmitted prefetch data.

In accordance with still another aspect of the present disclosure, there is provided a computing system including: a host device; and a storage device configured to: receive, from the host device, mapping information for data to be read, temporarily store the mapping information, receive, from the host device, a read request for the data, process the read request by using the mapping information, and maintain the mapping information therein after processing the read request.

In accordance with still another aspect of the present disclosure, there is provided a storage device including: a nonvolatile memory device; a map data storage configured to temporarily store a part of map data representing a relationship between a logical address of data, provided from a host device, and a physical address corresponding to a position in the nonvolatile memory device in which the data provided from the host device is stored; a prefetch data storage configured to store, as prefetch data map data about at least two logical addresses prefetched from the host device; and a memory controller configured to control the nonvolatile memory device and the prefetch data storage to: process a multi-chunk read command as a read request for the at least two logic addresses received from the host device by using the prefetch data, and maintain the prefetch data in the prefetch data storage.

In accordance with still another aspect of the present disclosure, there is provided an operating method of a controller, the operating method including: prefetching map data from a host into an operating memory; keeping the map data prefetched in the operating memory; and removing the prefetched map data from the operating memory when the map data is determined not to represent a relationship between a logical address and an actual physical address.

In an embodiment, the operating method further including: controlling, in response to a read request from the host, a memory device to perform a read operation thereon, and providing, to the host and as a response to the read request, information representing whether the read operation is performed according to the map data prefetched in the operating memory.

BRIEF DESCRIPTION OF THE DRAWINGS

Various embodiments of the present disclosure will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and should not be construed as limited to the embodiments set forth herein.

Figure 1:
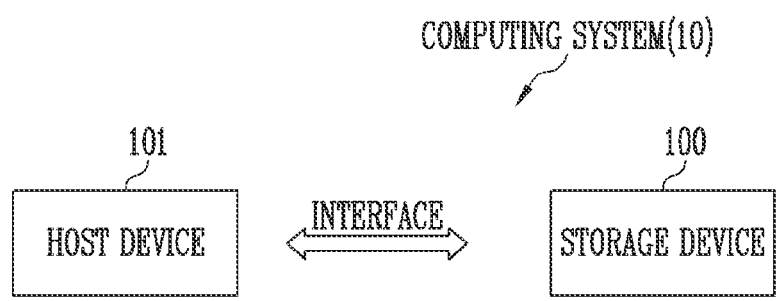
FIG. 1 is a diagram illustrating a computing system in accordance with an embodiment of the present disclosure.

FIG. 1 is a diagram illustrating a computing system 10 in accordance with an embodiment of the present disclosure.

Referring to FIG. 1, the computing system 10 may include a storage device 100 and a host device 101. The storage device 100 and the host device 101 may perform wired/wireless communication through various interfaces.

The host device 101 may communicate with the storage device 100, using at least one of various communication standards or interfaces, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

In this specification, for convenience of description, it is described that the storage device 100 and the host device 101 perform data communication according to a USF communication interface. However, embodiments of the present disclosure are not limited to that the data communication is performed according to the USF communication interface. Specifically, the storage device 100 and the host device 101 may perform data communication by using a command defined as a Protocol Information Unit (hereinafter, referred to as PIU). The PIU may be a type of data packet generated according to a predetermined protocol.

The PIU may be a command with which the host device 101 or the storage device 100 requests, instructs or responds to performance of an operation. In an embodiment, various PIUs may be defined according to uses and purposes. For example, the PIU may be any of a query request PIU, a command PIU, a response PIU, a data out PIU, a data in PIU, and a ready to transfer PIU.

In an embodiment, the query request PIU may include a device descriptor for providing several parameters. The device descriptor may include information representing whether the storage device 100 is a storage device which supports an advance replay protection memory block (RPMB) mode.

The smallest size of the PIU may be 32 bytes, and the largest size of the PIU may be 65,600 bytes. The format of the PIU may have different sizes according to types thereof. A hardware configuration of the host device 101 will be described in FIG. 2.

The storage device 100 may be a device for storing data under the control of the host device 101, such as a mobile phone, a smart phone, an MP3 player, a laptop computer, a desktop computer, a game console, a TV, a tablet PC or an in-vehicle infotainment system. Also, the storage device 100 may be a device for storing data under the control of the host device 101 for storing high-capacity data in one place, such as a server or a data center.

The storage device 100 may be manufactured as any of various types of storage devices according to a host interface that is a communication scheme with the host device 101. For example, the storage device 100 may be configured with any one of a variety of types of memory modules, such as a Solid State Drive (SSD), a multimedia card in the form of an MMC, an eMMC, an RS-MMC and a micro-MMC, a secure digital card in the form of an SD, a mini-SD and a micro-SD, a Universal Serial Bus (USB) memory module, a Universal Flash Storage (UFS) device, a personal computer memory card international association (PCMCIA) card type memory module, a peripheral component interconnection (PCI) card type memory module, a PCI express (PCI-E) card type memory module, a Compact Flash (CF) card, a Smart Media Card (SMC), and a memory stick.

The storage device 100 may be manufactured as any of various package types. For example, the storage device 100 may be manufactured as any of various package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP). A hardware configuration of the storage device 100 will be described in FIG. 2.

Figure 2:
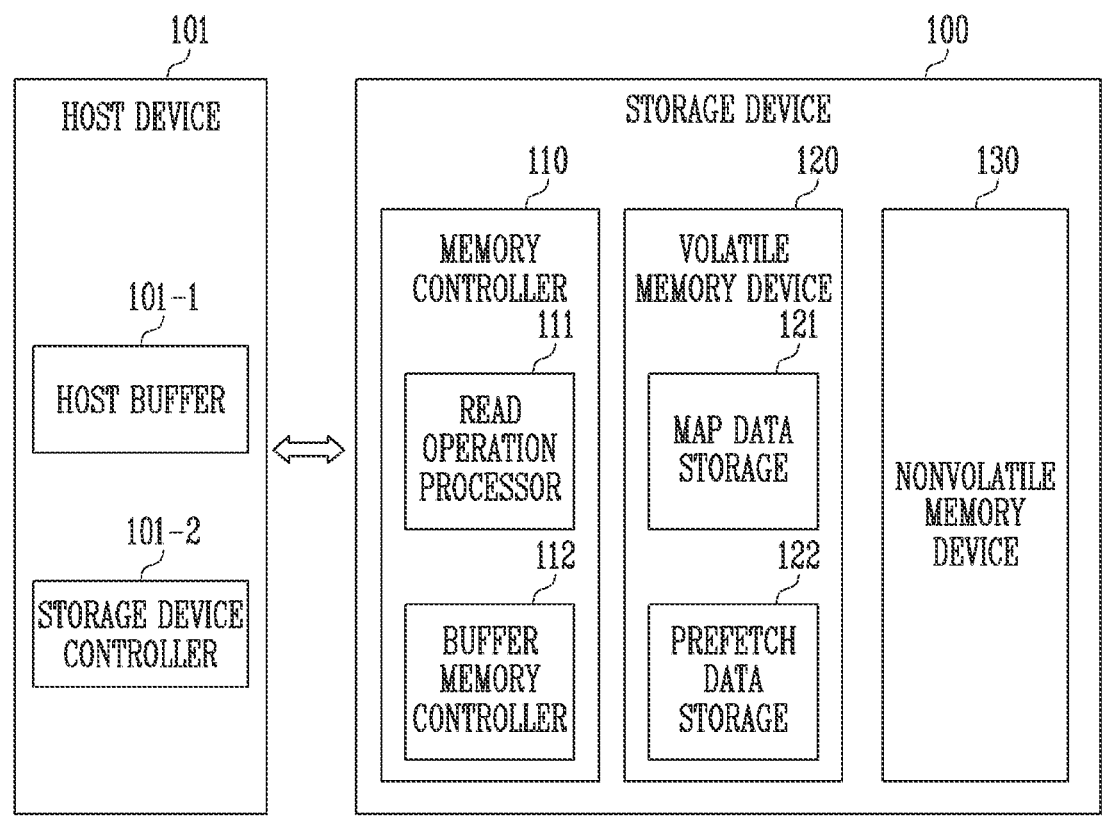
FIG. 2 is a diagram illustrating a storage device shown in FIG. 1 in accordance with an embodiment of the present disclosure.

FIG. 2 is a diagram illustrating the storage device 100 shown in FIG. 1 in accordance with an embodiment of the present disclosure.

Referring to FIG. 2, the host device 101 and the storage device 100 may include various hardware configurations.

The storage device 100 may include a memory controller 110, a volatile memory device 120, and a nonvolatile memory device 130. The memory controller 110 may include a read operation processor 111 and a buffer memory controller 112. In an example, the read operation processor 111 and the buffer memory controller 112 may correspond to a control logic which performs different functions in one chip.

The memory controller 110 may control overall operations of the storage device 100.

When power is applied to the storage device 100, the memory controller 110 may execute firmware (FW). When the nonvolatile memory device 130 is a flash memory device, the memory controller 110 may execute FW such as a Flash Translation Layer (FTL) for controlling communication between the host device 101 and the nonvolatile memory device 130.

In an embodiment, the memory controller 110 may receive data and a Logical Block Address (LBA) from the host device 101, and translate the LBA into a Physical Block Address (PBA) representing addresses of memory cells included in the nonvolatile memory device 130, in which data is to be stored.

The memory controller 110 may control the nonvolatile memory device 130 to perform a program operation, a read operation, an erase operation, or the like in response to a request from the host device 101. In the program operation, the memory controller 110 may provide a program command, a PBA, and data to the nonvolatile memory device 130. In the read operation, the memory controller 110 may provide a read command and a PBA to the nonvolatile memory device 130. In the erase operation, the memory controller 110 may provide an erase command and a PBA to the nonvolatile memory device 130.

In an embodiment, the memory controller 110 may autonomously generate a command, an address, and data regardless of any request from the host device 101, and transmit the command, the address, and the data to the nonvolatile memory device 130. For example, the memory controller 110 may provide the nonvolatile memory device 130 with a command, an address, and data, which are used to perform read and program operations accompanied in performing wear leveling, read reclaim, garbage collection, or the like.

In an embodiment, the memory controller 110 may control at least two nonvolatile memory devices 130. The memory controller 110 may control the nonvolatile memory devices 130 according to an interleaving scheme to improve operational performance. The interleaving scheme may be a scheme for controlling operations on at least two nonvolatile memory devices 130 which overlap with each other.

The read operation processor 111 may read data stored in the nonvolatile memory device 130 in response to a read command received from the host device 101.

The buffer memory controller 112 may control the volatile memory device 120. In an example, the buffer memory controller 112 may control the volatile memory device 120 to store map data representing a relationship between a logical address of data stored in the nonvolatile memory device 130 and a physical address corresponding to a position in the nonvolatile memory device 130 in which the data which the storage device 100 receives from the host device 101 is stored.

The volatile memory device 120 may store map data as mapping information between a physical address with respect to a plurality of memory cells included in the nonvolatile memory device 130 and a logical address of data stored in the plurality of memory cells. The volatile memory device 120 may be a Static Random Access Memory (SRAM).

A map data storage 121 may temporarily store some data among map data representing a relationship between a logical address of data, which the storage device 100 receives from the host device 101, and a physical address corresponding to a position in the nonvolatile memory device 130 in which the corresponding data is stored.

A prefetch data storage 122 may store, as prefetch data, map data about at least two logical addresses, the storage device 100 prefetching the map data from the host device 101. In an example, the map data about the at least two logical addresses which the storage device 100 receives from the host device 101 may include information on a physical address of the nonvolatile memory device 130 in which data having the at least two logical addresses which the storage device 100 receives from the host device 101 are stored.

A host buffer 101-1 may store map data as mapping information between a physical address with respect to a plurality of memory cells included in the nonvolatile memory device 130 and a logical address of data stored in the plurality of memory cells included in the nonvolatile memory device 130.

The storage device controller 101-2 may control the storage device 100. In an example, the storage device controller 101-2 may generate a signal for controlling the storage device 100 to store, in the prefetch data storage 122, map data about at least two logical addresses, the map data being prefetched from the host device 101.

The nonvolatile memory device 130 may include a memory cell array (not shown) including a plurality of memory cells for storing data.

Each of the memory cells may be configured as any of a Single Level Cell (SLC) capable of storing one data bit, a Multi-Level Cell (MLC) capable of storing two data bits, a Triple Level Cell (TLC) capable of storing three data bits, and a Quadruple Level Cell (QLC) capable of storing four data bits.

The memory cell array (not shown) may include a plurality of memory blocks. Each memory block may include a plurality of memory cells. Each memory block may include a plurality of pages. In an embodiment, the page may be a unit for storing data in the nonvolatile memory device 130 or reading data stored in the nonvolatile memory device 130. The memory block may be a unit for erasing data.

In an embodiment, the nonvolatile memory device 130 may be a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, for convenience of description, a case where the nonvolatile memory device 130 is a NAND flash memory is described.

The nonvolatile memory device 130 may receive a command and an address from the memory controller 110, and access an area selected by the address in the memory cell array. The nonvolatile memory device 130 may perform an operation indicated by the command on the area selected by the address. For example, the nonvolatile memory device 130 may perform a write operation (program operation), a read operation, and an erase operation. In the program operation, the nonvolatile memory device 130 may program data in the area selected by the address. In the read operation, the nonvolatile memory device 130 may read data from the area selected by the address. In the erase operation, the nonvolatile memory device 130 may erase data stored in the area selected by the address.

Figure 3:
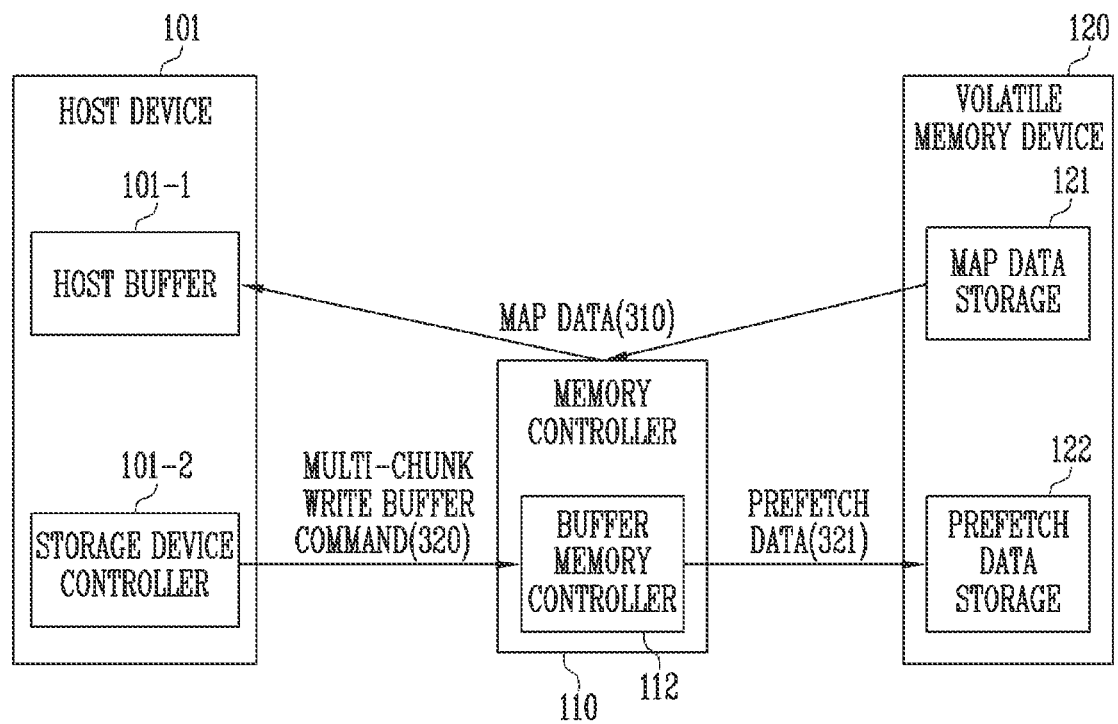
FIG. 3 is a diagram illustrating an operation of storing prefetch data in a prefetch data storage according to a multi-chunk write buffer command in accordance with an embodiment of the present disclosure.

FIG. 3 is a diagram illustrating an operation of storing prefetch data 321 in the prefetch data storage 122 according to a multi-chunk write buffer command 320. The prefetch data 321 may be map data about at least two logical addresses which the storage device 100 shown with reference to FIG. 2 receives from the host device 101.

Referring to FIG. 3, the storage device 100 may store the prefetch data 321 in the prefetch data storage 122 by receiving the multi-chunk write buffer command 320 from the host device 101.

The host device 101 may receive map data 310 stored in the map data storage 121 of the volatile memory device 120 from the memory controller 110 and store the received map data 310 in the host buffer 101-1. The map data 310 may be data representing a relationship between a logical address of data stored in the nonvolatile memory device 130 shown with reference to FIG. 2 and a physical address as a position of the nonvolatile memory device 130 which stores the corresponding data.

The memory controller 110 of the storage device 100 shown with reference to FIG. 2 may receive the multi-chunk write buffer command 320 which the storage device controller 101-2 of the host device 101 generates. The multi-chunk write buffer command 320 may include the prefetch data 321.

The buffer memory controller 112 included in the memory controller 110 may store the prefetch data 321 included in the multi-chunk write buffer command 320 in the prefetch data storage 122 in response to the multi-chunk write buffer command 320 which the storage device 100 receives.

In an example, the multi-chunk write buffer command 320 may include at least two logical addresses. The at least two logical addresses included in the multi-chunk write buffer command 320 may be logical addresses with respect to data of a plurality of chunks. In response to that the storage device 100 receives the multi-chunk write buffer command 320 including at least two logical addresses of data received from the host device 101, the storage device 100 may store, in the prefetch data storage 122, the prefetch data as information on a relationship between the at least two logical addresses of the received data and a physical address representing a position of the nonvolatile memory device 130 in which the received data is stored.

The prefetch data 321 may be a portion of the map data 310 which the host buffer 101 receives from the storage device 100.

Figure 4:
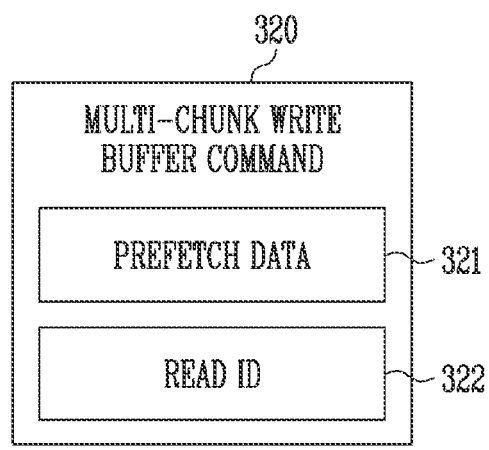
FIG. 4 is a diagram illustrating the multi-chunk write buffer command in accordance with an embodiment of the present disclosure.

FIG. 4 is a diagram illustrating the multi-chunk write buffer command 320 in accordance with an embodiment of the present disclosure.

Referring to FIG. 4, the multi-chunk write buffer command 320 may include prefetch data 321 and a read ID 322.

The prefetch data 321 may be included in the multi-chunk write buffer command 320 which the host device 101 shown with reference to FIG. 3 transmits to the storage device 100. The read ID 322 may be an identifier for determining whether a multi-chunk read command (not shown) which the host device 101 transmits to the storage device 100 is a read command for a Host Performance Booster (HPB) operation.

Figure 5:
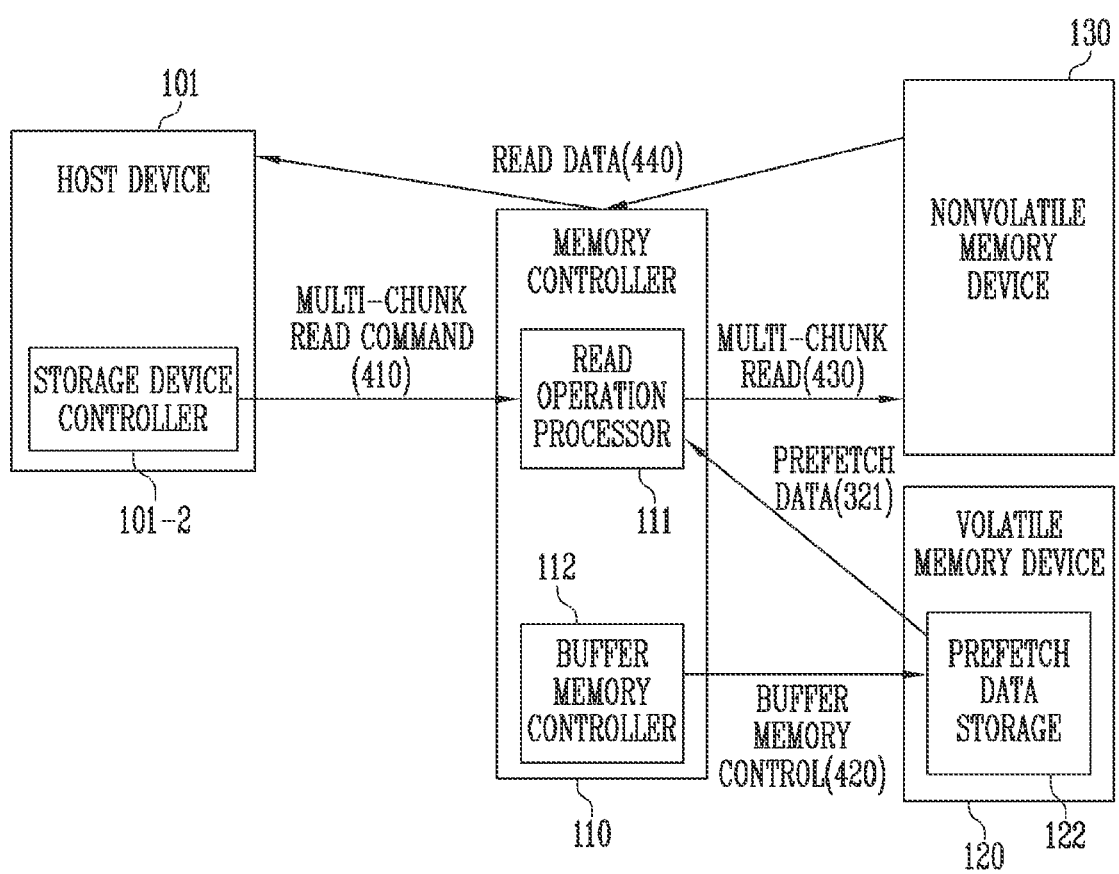
FIG. 5 is a diagram illustrating an operation of reading data stored in a nonvolatile memory device according to a multi-chunk write buffer command in accordance with an embodiment of the present disclosure.

FIG. 5 is a diagram illustrating an operation of reading data stored in the nonvolatile memory device 130 according to a multi-chunk write buffer command 410 in accordance with an embodiment of the present disclosure.

Referring to FIG. 5, the storage device 100 may perform a multi-chunk read 430 operation on data stored in the nonvolatile memory device 130 by receiving the multi-chunk read command 410 from the host device 101.

The storage device 100 may receive the multi-chunk read command 410 including a read ID which the storage device controller 101-2 generates and information on at least two logical addresses. In an example, the read ID included in the multi-chunk read command 410 may be identical to the read ID 322 included in the multi-chunk write buffer command 320 shown with reference to FIG. 4. In response to that the read ID of the multi-chunk read command 410 which the storage device 100 receives and the read ID 322 of the multi-chunk write buffer command 320 which the storage device 100 receives are the same, the storage device 100 may perform the multi-chunk read 430 operation. The multi-chunk read 430 operation may be an HPB read operation.

In response to that the storage device 100 receives the multi-chunk read command 140 from the storage device controller 101-2, the buffer memory controller 112 may perform a buffer memory control 420 operation. In an embodiment, in response to that the storage device 100 receives the multi-chuck read command 410 from the storage device controller 101-2, the buffer memory controller 112 may acquire prefetch data 321 stored in the prefetch data storage 122 and output the acquired prefetch data 321 to the read operation processor 111.

The buffer memory controller 112 may process the multi-chunk read command 410 as a read request for at least two logical addresses received from the host device 101 by using the prefetch data 321. In an embodiment, in response to that the storage device 100 receives the multi-chunk read command 410 from the storage device controller 101-2, the read operation processor 111 receiving the prefetch data 321 from the buffer memory controller 112 may perform the multi-chunk read 430 operation on the nonvolatile memory device 130 by using the prefetch data 321.

The host device 101 may receive read data 440 of the nonvolatile memory device 130 from the memory controller 110.

Figure 6:
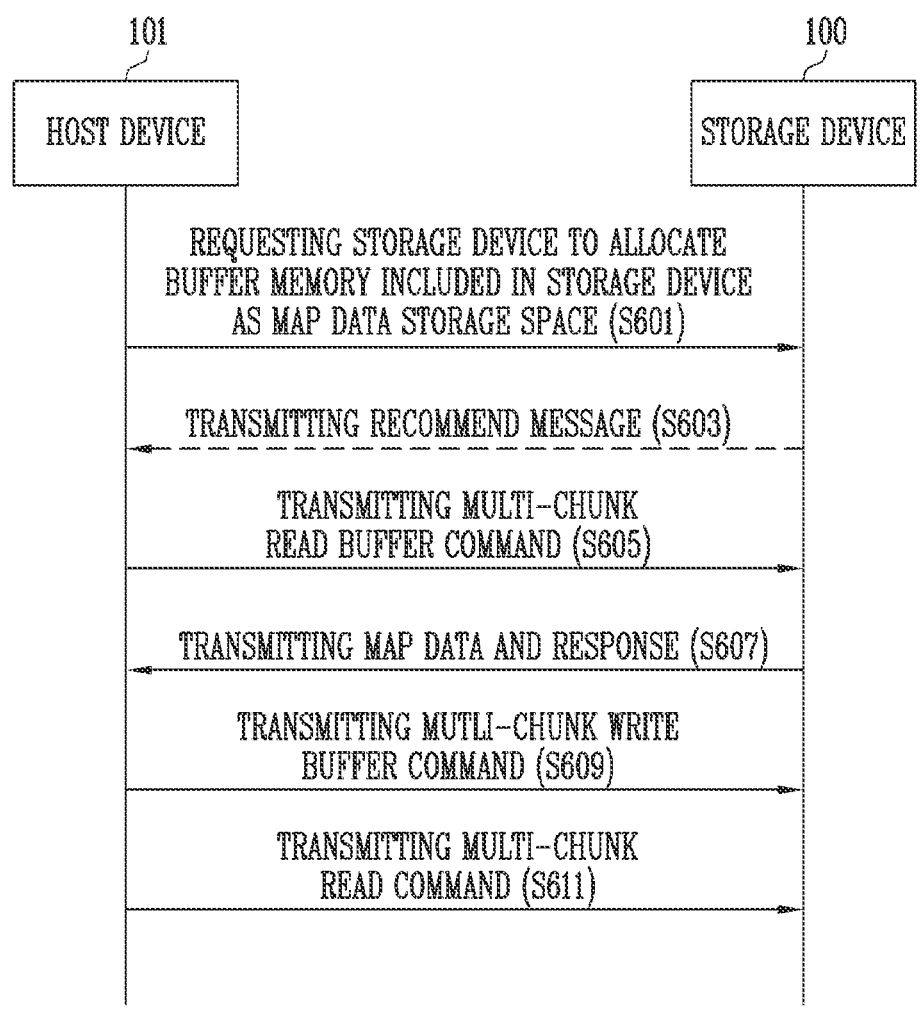
FIG. 6 is a diagram illustrating data transmission/reception between a host device and the storage device in accordance with an embodiment of the present disclosure.

FIG. 6 is a diagram illustrating data transmission/reception between the host device 101 and the storage device 100 in accordance with an embodiment of the present disclosure.

In operation S601, the host device 101 may request the storage device 100 shown with reference to FIG. 2 to allocate a buffer memory (e.g., the volatile memory device 120 shown in FIG. 2) included in the storage device 100 as a map data storage space. In an example, the host device 101 may transmit a message instructing the storage device 100 to allocate the prefetch data storage 122 as a partial region in the volatile memory device 120 shown with reference to FIG. 2 as a map data (or prefetch data) storage space. The storage device 100 receiving the message instructing the storage device 100 to allocate the partial region as the map data storage space from the host device 101 may allocate the prefetch data storage 122 included in the volatile memory device 120 shown with reference to FIG. 2 as a space for map data storage. Specifically, in response to that the storage device 100 receives the message instructing the storage device 100 to allocate the partial region as the map data storage space from the host device 101, the buffer memory controller 112 shown with reference to FIG. 2 may allocate the prefetch data storage 122 shown with reference to FIG. 2 as a space for storing map data. In an example, the map data of the operation S601 may represent a relationship between a logical address of data stored in the nonvolatile memory device 130 and a physical address corresponding to a position in the nonvolatile memory device 130 shown with reference to FIG. 2, in which data provided from the host device 101 is stored.

In operation S603, the storage device 100 may transmit a recommend message to the host device 101. The recommend message which the storage device 100 transmits to the host device 101 may include information on whether the map data of the operation S601 is to be updated. The storage device 100 may not transmit the recommend message to the host device 101. Therefore, the operation S603 may be omitted.

In operation S605, the host device 101 may transmit a multi-chunk read buffer command to the storage device 100. In an example, the multi-chunk read buffer command may be a request which allows the storage device to transmit map data representing a relationship between a logical address of data stored in the nonvolatile memory device 130 and a physical address corresponding to a position in the nonvolatile memory device 130 in which the data provided from the host device 101 is stored.

In operation S607, the storage device 100 may transmit map data and a response to the host device 101. The map data which the storage device 100 transmits to the host device 101 may be the map data of the operation S605. The storage device 100 may simultaneously transmit the response to the request of the host device 101 while transmitting the map data to the host device 101. In another example, the storage device 100 may transmit the map data to the host device 101 and then transmit the response to the request of the host device 101. The response of the operation S607 may be a response including information representing whether the storage device 100 has transmitted the map data to the host device 101, corresponding to the multi-chunk read buffer command which the host device 101 transmits in the operation S605.

In operation S609, the host device 101 may transmit the multi-chunk write buffer command 320 to the storage device 100. The multi-chunk write buffer command 320 of the operation S609 may be a HPB WRITE BUFFER command defined in the JESD220-3A standard. Hereinafter, the HPB WRITE BUFFER command will be described with reference to Table 1.

TABLE 1

| Byte | Bit | | | | | | | |
|---|---|---|---|---|---|---|---|---|
| | 7 | 6 | 5 | 4 | 3 | 2 | 1 | 0 |
| 0 | OPERATION CODE (Fah) | | | | | | | |
| 1 | BUFFER ID = 02h | | | | | | | |
| 2 | (MSB) | | LOGICAL BLOCK ADDRESS | | | | | |
| ... | | | | | | | | |
| 5 | | | | | | | | (LSB) |
| 6 | HPB READ ID | | | | | | | |

TABLE 1-continued

| Byte | Bit | | | | | | | |
|---|---|---|---|---|---|---|---|---|
| | 7 | 6 | 5 | 4 | 3 | 2 | 1 | 0 |
| 7 | (MSB) | | PARAMETER LIST LENGTH | | | | | |
| 8 | | | | | | | | (LSB) |
| 9 | CONTROL = 00H | | | | | | | |

Table 1 represents the HPB WRITE BUFFER command defined in the JESD220-3A.

The HPB WRITE BUFFER command may include a logical block address (or logical address) and an HPB READ ID (or read identifier). The logical block address may be a first logical block address corresponding to first map data to be transmitted to the storage device 100. A relationship between the HPB WRITE BUFFER command and a read command which will be described later, may be represented as a value of the HPB READ ID. For example, when the value of the HPB READ ID is 1, the HPB WRITE BUFFER command and the read command may be commands associated with each other. In an example, the HPB WRITE BUFFER command may include a first logical address.

In an embodiment, after the memory controller 110 receives the multi-chunk write buffer command 320 shown with reference to FIG. 3 from the host device 101, the memory controller 110 may receive data from the host device 101. The data which the memory controller 110 receives from the host device 101 may be transmitted through a DATA UPIU for the HPB WRITE BUFFER command defined in the JESD220-3A. Hereinafter, the DATA UPIU will be described with reference to Table 2.

TABLE 2

| Byte | Bit | | | | | | | |
|---|---|---|---|---|---|---|---|---|
| | 7 | 6 | 5 | 4 | 3 | 2 | 1 | 0 |
| 0 | (MSB) | | HPB Entry 1 (for 1$^{st}$ LBA) | | | | | |
| 1 | | | | | | | | |
| ... | | | | | | | | |
| 7 | | | | | | | | (LSB) |
| ... | | | ... | | | | | |
| 8*(N-1) | (MSB) | | HPB Entry N (for Nth LBA) | | | | | |
| 8*(N-1) + 1 | | | | | | | | |
| ... | | | | | | | | |
| 8*(N-1) + 7 | | | | | | | | (LSB) |

Table 2 represents the DATA UPIU for the HPB WRITE BUFFER command defined in the JESD220-3A. The DATA UPIU for the HPB WRITE BUFFER command may include HPB entries (or map data) corresponding to different LBAs (or logical addresses) for every 8 bytes. That is, the DATA UPIU for the HPB WRITE BUFFER command may include a plurality of map data corresponding to different logical addresses.

In operation S611, the host device 101 may transmit the multi-chunk read command 410 to the storage device 100. The storage device 100 receiving the multi-chunk read command 410 may control the nonvolatile memory device 130 such that data stored on the nonvolatile memory device 130 is read. In an example, the read operation processor 111 shown with reference to FIG. 2 may receive the multi-chunk read command and then control the nonvolatile memory device 130 such that data stored in a memory block having a physical address with respect to a logical address corresponding to the multi-chunk read command 410 is read.

Figure 7:
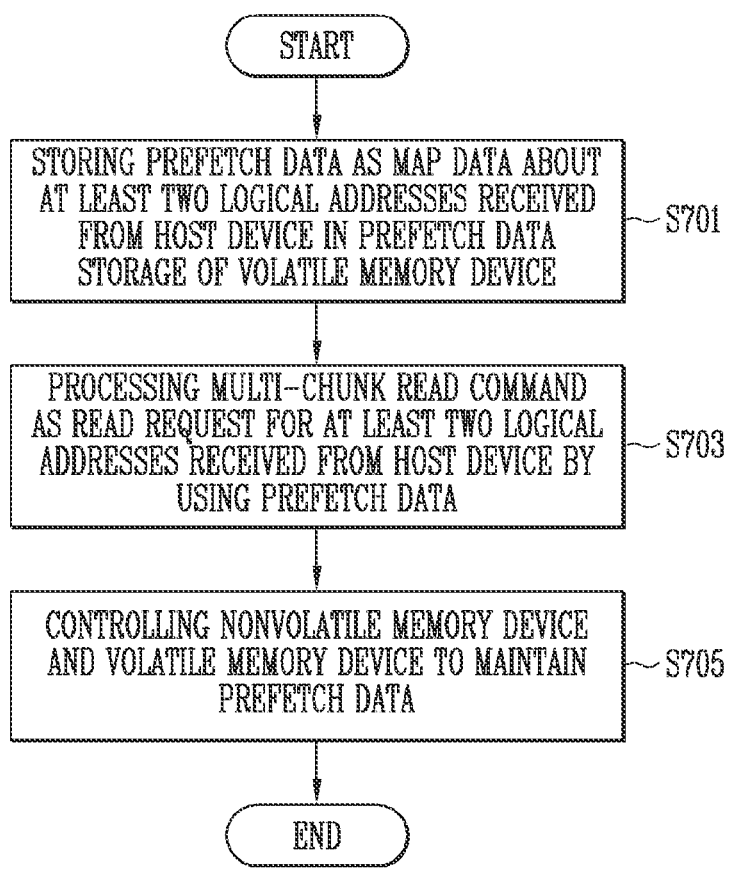
FIG. 7 is a flowchart for describing an operation of the storage device in accordance with an embodiment of the present disclosure.

FIG. 7 is a flowchart for describing an operation of the storage device 100 in accordance with an embodiment of the present disclosure.

Referring to FIG. 7, the storages device 100 may read data corresponding to at least two logical addresses by using the prefetch data 321, which is map data about at least two logical addresses of data stored in the nonvolatile memory device 130, and then maintain the prefetch data 321 in the prefetch data storage 122. Operations S701 to S705 shown in FIG. 7 may be performed by the read operation processor 111 or the buffer memory controller 112, which are included in the memory controller 110.

In operation S701, the buffer memory controller 112 may store, as the prefetch data 321 and in the prefetch data storage 122 of the volatile memory device 120, map data about at least two logical addresses, the map data being prefetched from the host device 101.

In operation S703, the read operation processor 111 may process the multi-chunk read command 410 as a read request for at least two logical addresses received from the host device 101 by using the prefetch data. In an example, the read operation controller 111 may read data corresponding to the at least two logical addresses received from the host device 101 by using the prefetch data 321 stored in the prefetch data storage 122 in response to the multi-chunk read command 410 as the read request for the at least two logical addresses received from the host device 101.

In operation S705, the buffer memory controller 112 may control the nonvolatile memory device 130 and the volatile memory device 120 to maintain the prefetch data in the prefetch data storage 122. In an example, the buffer memory controller 112 does not remove the prefetch data 321 from the prefetch data storage 122 but may maintain the prefetch data 321 in the prefetch data storage 122 even after the data corresponding to the at least two logical addresses received from the host device 101 is read by using the prefetch data 321 stored in the prefetch data storage 122. Therefore, when the volatile memory device 120 again receives the multi-chunk read command including information on a logical address corresponding to the prefetch data 321 from the host device 101, the memory controller 110 may process the multi-chunk read command by again using the prefetch data stored in the prefetch data storage 122.

In an embodiment, the buffer memory controller 112 may control the nonvolatile memory device 130 and the volatile memory device 120 to remove the prefetch data. In an embodiment, the read operation processor 111 may determine whether the prefetch data has changed. For example, the read operation processor 111 may determine that the prefetch data is changed when a relationship between a physical address and a logical address is changed by overwrite, garbage collection, read reclaim, or static wear leveling. The read operation processor 111 may remove the prefetch data from the prefetch data storage 122 when the prefetch data is changed.

The read operation processor 111 shown with reference to FIG. 2 may transmit, to the host device 101, a response message including information representing whether the storage device 100 has processed the multi-chunk read command received from the host device 101 by using the prefetch data stored in the prefetch data storage 122. In an embodiment, the read operation processor 111 may transmit, to the host device 101, a response message including information representing whether the storage device 100 has processed data acquired by processing the multi-chunk read command by using the prefetch data stored in the prefetch data storage 122 after being provided to the host device 101.

In another embodiment, the read operation processor 111 may transmit, to the host device 101, a response message including information representing whether data acquired by processing the multi-chunk read command has processed by using the prefetch data stored in the prefetch data storage 122 while being provided to the host device 101.

In response to that the response message received from the storage device 100 includes information representing that the storage device 100 has processed the multi-chunk read command by using the prefetch data, the host device 101 may again transmit the multi-chunk read command to the storage device. Accordingly, in response to that the storage device 100 again receives the multi-chunk read command, the storage device may process the multi-chunk read command by using the prefetch data maintained in the prefetch data storage 122.

In response to that the response message received from the storage device 100 includes information representing that the storage device 100 has not processed the multi-chunk read command by using prefetch data, the host device 101 may transmit, to the storage device 100, a multi-chunk read buffer command as a read request for map data about the nonvolatile memory device 130 shown with reference to FIG. 2.

The response message which the storage device 100 transmits to the host device 101 may be a Response UFS Protocol Information Unit (Response UPIU) defined in the JESD220-3A standard. Hereinafter, the Response UFS Protocol Information Unit (Response UPIU) will be described with reference to Table 3.

TABLE 3

| 0 | 1 | 2 | 3 |
|---|---|---|---|
| Xx10 0001b | Flags | LUN | Task Tag |
| 4 | 5 | 6 | 7 |
| IIDCommand Set Type | Reserved | Response | Status = Good (00 h) |
| 8 | 9 | 10 | 11 |
| Total EHS Length (00 h) | Device Information bit 1; HPB UPDATE ALERT = 1 | Data Segment Length (14 h) | |
| 12 (MSB) | 13 | 14 | 15 (LSB) |
| Residual Transfer Count | | | |
| 16 | 17 | 18 | 19 |
| Reserved | | | |
| 20 | 21 | 22 | 23 |
| Reserved | | | |
| 24 | 25 | 26 | 27 |
| Reserved | | | |
| 28 | 29 | 30 | 31 |
| Reserved | | | |
| Header E2ECRC (omit if HD = 0) | | | |
| K (MSB) | K + 1 (LSB) | K + 2 | K + 3 |
| Sense Data Length (12 h) | | Descriptor Type (80 h) | Additional Length (10 h) |
| K + 4 | K + 5 | K + 6 | K + 7 |
| HPB Operation | LUN | Active HPB Count | Inactive HPB Count |
| K + 8 (MSB) | K + 9 (LSB) | K + 10 (MSB) | K + 11 (LSB) |
| Active HPB Region 0 | | HPB Sub-Region of [K + 8:K + 9] | |
| K + 12 (MSB) | K + 13 (LSB) | K + 14 (MSB) | K + 15 (LSB) |
| Active HPB Region 1 | | HPB Sub-Region of [K + 12:K + 13] | |
| K + 16 (MSB) | K + 17 (LSB) | K + 18 (MSB) | K + 19 (LSB) |
| Inactive HPB Region 0 | | Inactive HPB Region 1 | |
| Data E2ECRC (omit if DD = 0) | | | |

Table 3 represents the Response UPIU defined in the JESD220-3A standard. The Response UPIU defined in the JESD220-3A standard may include a plurality of data frames. A data frame of K+4 Bytes among the data frames included in the Response UPIU defined in the JESD220-3A standard may include data corresponding to an HPB operation. Hereinafter, Table 4 represents definitions of data frames from K bytes to K+19 Bytes among the data frames included in the Response UPIU defined in the JESD220-3A standard.

TABLE 4

| Byte | HPB Information |
|---|---|
| [K:K + 1] | Sense Data Length (12 h) |
| [K + 2] | Descriptor Type (80 h-Vendor Specific Sense Data Descriptor Format in SPC) This Sense Data is defined as HPB Sense Data in UFS Spec. |
| [K + 3] | Additional Length (10 h) |
| [K + 4] | HPB Operation 00 h: None, 01 h: Request for HPB Region Update 02 h: Device reset HPB Regions information Others: Reserved for future extension |
| [K + 5] | Target LUN for Active Region/Sub-Region and Inactive Region |
| [K + 6] | Active HPB Count 00 h: [K + 8:K + 15] is not valid. 01 h: [K + 8:K + 11] is valid. 02 h: [K + 8:K + 11] and [K + 12:K + 15] are valid. Others: Reserved |
| [K + 7] | Inactive HPB Count 00 h: [K+16:K + 19] is not valid. 01 h: [K + 16:K + 17] is valid. 02 h: [K + 16:K + 17] and [K + 18:K + 19] are valid. Others: Reserved |
| [K + 8:K + 11] | 1st HPB Region and HPB Sub-Region that Host is recommended to read L2P map data |
| [K + 12:K + 15] | 2nd HPB Region and HPB Sub-Region that Host is recommended to read L2P map data |
| [K + 16:K + 17] | 1st HPB Region to be inactivated. |
| [K + 18:K + 19] | 2nd HPB Region to be inactivated. |

Table 4 represents HPB Sense Data defined in the JESD22-3A standard. When data frame of K+4 Bytes among the data frames included in the Response UPIU defined in the JESD220-3A standard has a value of 01h, a request for updating an HPB region may be performed. When the data frame of K+4 Bytes among the data frames included in the Response UPIU defined in the JESD220-3A standard has a value of 02h, a request for resetting the HPB region may be performed. In an example, when the data frame of K+4 Bytes among the data frames included in the Response UPIU defined in the JESD220-3A standard has a value except 00h, 01h or 02h, a defined operation may be performed. In an embodiment, when the data frame of K+4 Bytes among the data frames included in the Response UPIU defined in the JESD220-3A standard has a value of 03h, which is newly defined, the memory controller 110 may be set to transmit information representing whether the memory controller 110 has read data stored in the nonvolatile memory device 130 by using the prefetch data stored in the prefetch data storage 122.

Figure 8:
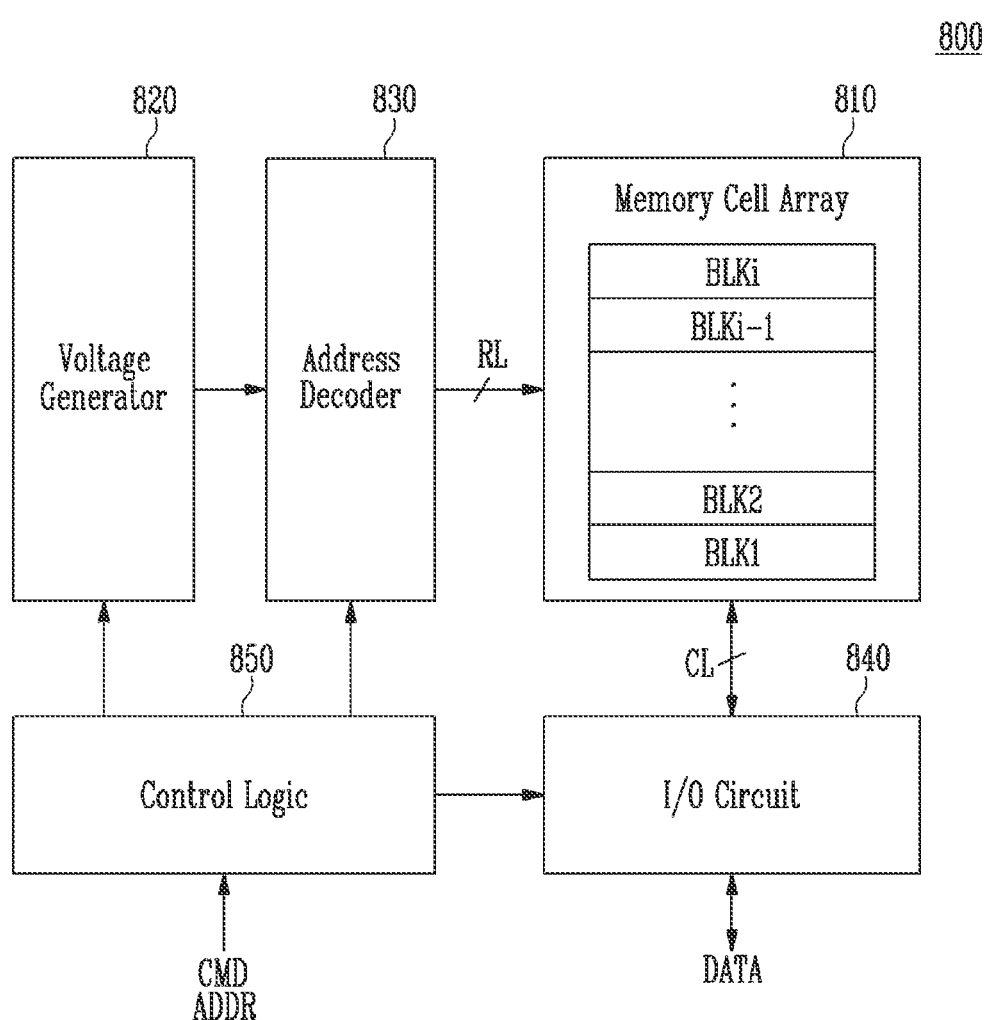
FIG. 8 is a diagram illustrating a memory device in accordance with an embodiment of the present disclosure.

FIG. 8 is a diagram illustrating a memory device 800 in accordance with an embodiment of the present disclosure. The memory device 800 shown in FIG. 8 is merely designated by another reference numeral for convenience of description, and may be understood as the same component as the nonvolatile memory device 130 shown in FIG. 2.

Referring to FIG. 8, the memory device 800 may include a memory cell array 810, a voltage generator 820, an address decoder 830, an input/output (I/O) circuit 840, and a control logic 850.

The memory cell array 810 may include a plurality of memory blocks BLK1 to BLKi. The plurality of memory blocks BLK1 to BLKi may be connected to the address decoder 830 through row lines RL. The plurality of memory blocks BLK1 to BLKi may be connected to the input/output circuit 840 through column lines CL. In an embodiment, the row lines RL may include word lines, source select lines, and drain select lines. In an embodiment, the column lines CL may include bit lines.

Each of the plurality of memory blocks BLK1 to BLKi includes a plurality of memory cells. In an embodiment, the plurality of memory cells may be nonvolatile memory cells. Memory cells connected to the same word line among the plurality of memory cells may be defined as one physical page. That is, the memory cell array 810 may include a plurality of physical pages. Each of the memory cells of the memory device 800 may be configured as a Single Level Cell (SLC) storing one data bit, a Multi-Level Cell (MLC) storing two data bits, a Triple Level Cell (TLC) storing three data bits, or a Quad Level Cell (QLC) storing four data bits.

In an embodiment, the voltage generator 820, the address decoder 830, and the input/output circuit 840 may be commonly designated as a peripheral circuit. The peripheral circuit may drive the memory cell array 810 under the control of the control logic 850. The peripheral circuit may drive the memory cell array 810 to perform a program operation, a read operation, and an erase operation.

The voltage generator 820 may generate a plurality of operating voltages by using an external power voltage supplied to the memory device 800. The voltage generator 820 may operate under the control of the control logic 850.

In an embodiment, the voltage generator 820 may generate an internal power voltage by regulating the external power voltage. The internal power voltage generated by the voltage generator 820 may be used as an operating voltage of the memory device 800.

In an embodiment, the voltage generator 820 may generate a plurality of operating voltages by using the external power voltage or the internal power voltage. The voltage generator 820 may generate various voltages required in the memory device 800. For example, the voltage generator 820 may generate a plurality of erase voltages, a plurality of program voltages, a plurality of pass voltages, a plurality of select read voltages, and a plurality of unselect read voltages.

In order to generate a plurality of operating voltages having various voltage levels, the voltage generator 820 may include a plurality of pumping capacitors which receive the internal power voltage. The voltage generator 820 may generate the plurality of operating voltages by selectively activating the plurality of pumping capacitors under the control of the control logic 850.

The plurality of operating voltages generated by the voltage generator 820 may be supplied to the memory cell array 810 by the address decoder 830.

The address decoder 830 may be connected to the memory cell array 810 through the row lines RL. The address decoder 830 may operate under the control of the control logic 850. The address decoder 830 may receive an address ADDR from the control logic 850. The address decoder 830 may decode a block address in the received address ADDR. The address decoder 830 may select at least one memory block among the memory blocks BLK1 to BLKi according to the decoded block address. The address decoder 830 may decode a row address in the received address ADDR. The address decoder 830 may select at least one word line among word lines of the selected memory block according to the decoded row address. In an embodiment, the address decoder 830 may decode a column address in the received address ADDR. The address decoder 830 may connect the input/output circuit 840 and the memory cell array 810 to each other according to the decoded column address.

The address decoder 830 may include components such as a row decoder, a column decoder, and an address decoder.

The input/output circuit 840 may include a plurality of page buffers. The plurality of page buffers may be connected to the memory cell array 810 through the bit lines. In a program operation, data may be stored in selected memory cells according to data stored in the plurality of page buffers.

In a read operation, the data stored in the selected memory cells may be sensed through the bit lines, and the sensed data may be stored in the page buffers.

The control logic 850 may control the address decoder 830, the voltage generator 820, and the input/output circuit 840. The control logic 850 may operate in response to a command CMD transferred from an external device. The control logic 850 may control the peripheral circuit by generating control signals in response to the command CMD and the address ADDR.

Figure 9:
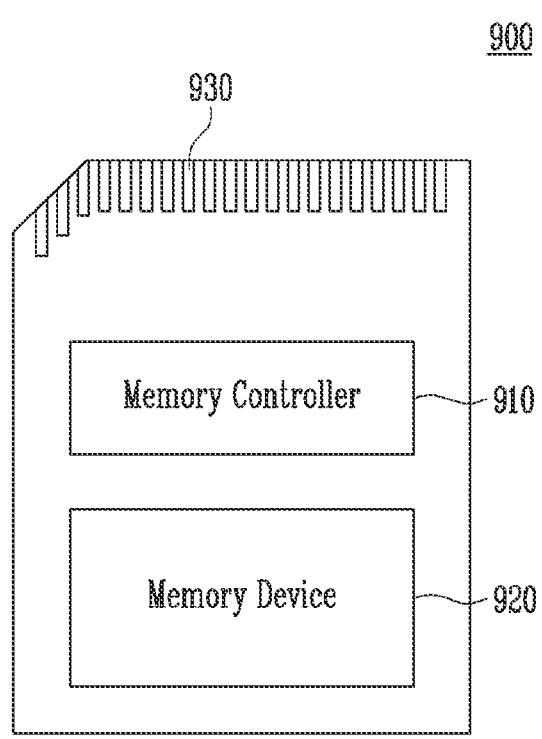
FIG. 9 is a block diagram illustrating a memory card system to which the storage device is applied in accordance with an embodiment of the present disclosure.

FIG. 9 is a block diagram illustrating a memory card system 900 to which the storage device is applied in accordance with an embodiment of the present disclosure.

Referring to FIG. 9, the memory card system 900 includes a memory controller 910, a memory device 920, and a connector 930.

The memory controller 910 is connected to the memory device 920. The memory controller 910 may access the memory device 920. For example, the memory controller 910 may control read, program, erase, and background operations of the memory device 920. The memory controller 910 provides an interface between the memory device 920 and a host. The memory controller 910 may drive firmware for controlling the memory device 920. The memory controller 910 may be implemented identically to the memory controller 110 described with reference to FIG. 2.

The memory controller 910 may include components such as a Random Access Memory (RAM), a processing unit, a host interface, a memory interface, and an ECC circuit.

The memory controller 910 may communicate with an external device through the connector 930. The memory controller 910 may communicate with the external device (e.g., the host) according to a specific communication protocol. The memory controller 910 may communicate with the external device through at least one of various communication standards or interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe. The connector 2300 may be defined by at least one of the above-described various communication protocols.

The memory device 920 may be implemented with various nonvolatile memory devices such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Torque Transfer magnetic RAM (STT-MRAM).

The memory controller 910 and the memory device 920 may be integrated into a single semiconductor device, to constitute a memory card. For example, the memory controller 910 and the memory device 920 may constitute a memory card such as a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

Figure 10:
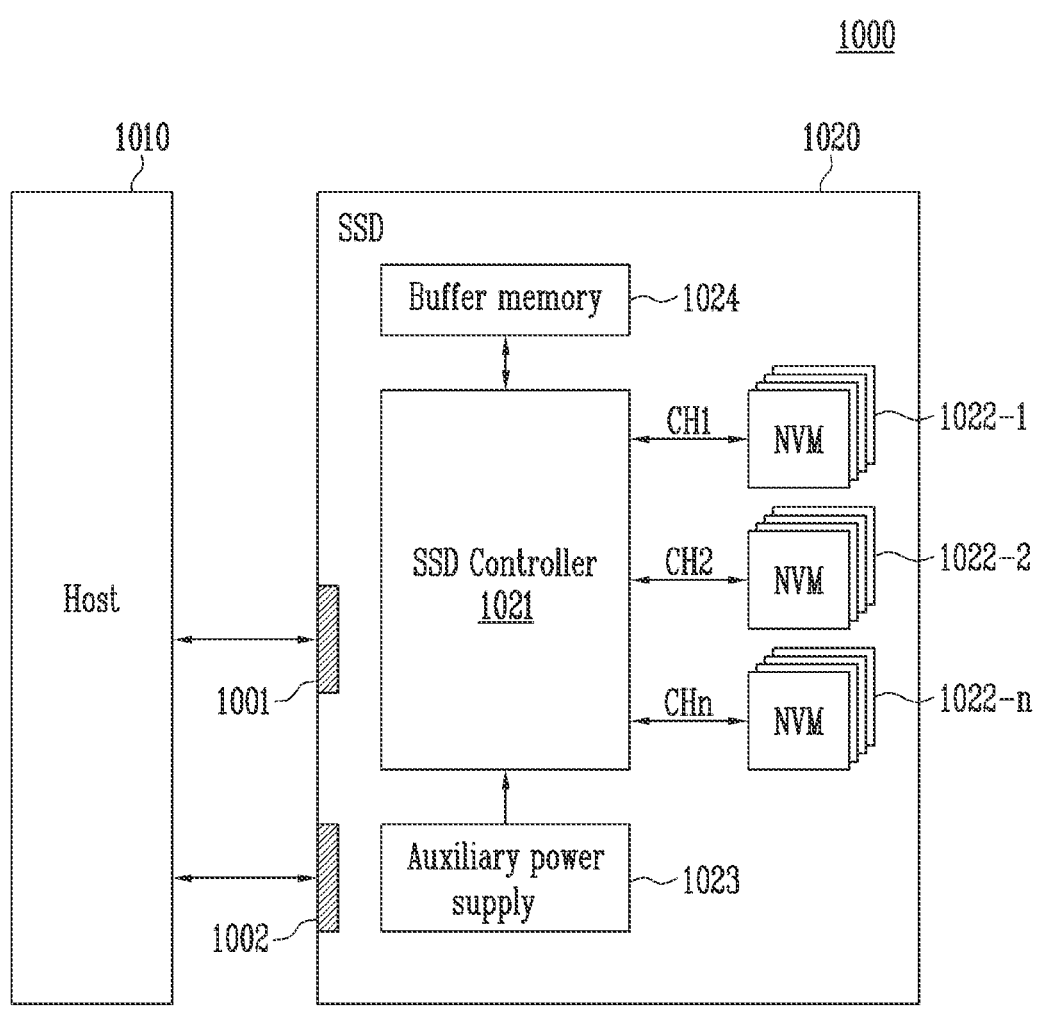
FIG. 10 is a block diagram illustrating a Solid State Drive (SSD) system to which the storage device is applied in accordance with an embodiment of the present disclosure.

FIG. 10 is a block diagram illustrating a Solid State Drive (SSD) system 1000 to which the storage device is applied in accordance with an embodiment of the present disclosure.

Referring to FIG. 10, the SSD system 1000 includes a host 1010 and an SSD 1020. The SSD 1020 exchanges a signal with the host 1010 through a signal connector 1001, and receives power through a power connector 1002. The SSD 1020 includes an SSD controller 1021, a plurality of flash memories 1022-1 to 1022-n, an auxiliary power supply 1023, and a buffer memory 1024.

In an embodiment, the SSD controller 1021 may serve as the memory controller 110 described with reference to FIG. 2.

The SSD controller 1021 may control the plurality of flash memories 1022-1 to 1022-n in response to a signal received from the host 1010. The signal may be a signal based on an interface between the host 1010 and the SSD 1020. For example, the signal may be a signal defined by at least one of communication standards or interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The auxiliary power supply 1023 is connected to the host 1010 through the power connector 1002. The auxiliary power supply 1023 may receive the power PWR input from the host 1010, and charge with the power PWR. When the supply of power from the host 1010 is not smooth, the auxiliary power supply 1023 may provide power to the SSD 1020. The auxiliary power supply 1023 may be located in the SSD 1020, or be located at the outside of the SSD 1020. For example, the auxiliary power supply 1023 may be located on a main board, and provide auxiliary power to the SSD 1020.

The buffer memory 1024 operates as a buffer memory of the SSD 1020. For example, the buffer memory 1024 may temporarily store data received from the host 1010 or data received from the plurality of flash memories 1022-1 to 1022-n, or temporarily store metadata (e.g., a mapping table) of the flash memories 1022-1 to 1022-n. The buffer memory 1024 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 11:
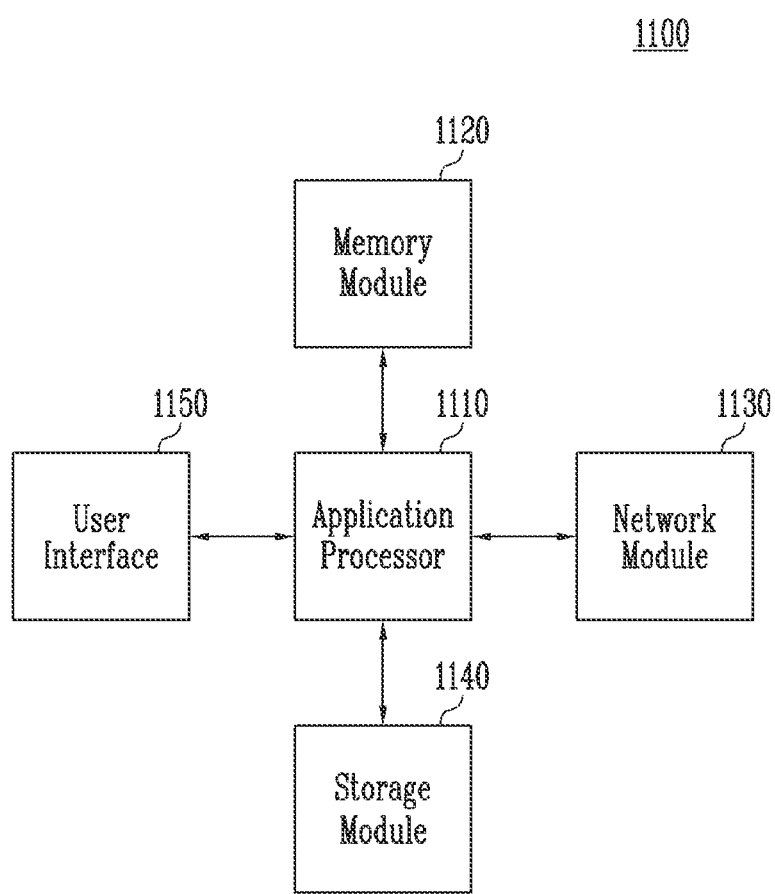
FIG. 11 is a block diagram illustrating a user system to which the storage device is applied in accordance with an embodiment of the present disclosure.

FIG. 11 is a block diagram illustrating a user system 1100 to which the storage device is applied in accordance with an embodiment of the present disclosure.

Referring to FIG. 11, the user system 1100 includes an application processor 1110, a memory module 1120, a network module 1130, a storage module 1140, and a user interface 1150.

The application processor 1110 may drive components included in the user system 1100, an operating system (OS), a user program, or the like. The application processor 1110 may include controllers for controlling components included in the user system 1100, interfaces, a graphic engine, and the like. The application processor 1110 may be provided as a System-on-Chip (SoC).

The memory module 1120 may operate as a main memory, working memory, buffer memory or cache memory of the user system 1100. The memory module 1120 may include volatile random access memories such as a DRAM, an SDRAM, a DDR SDRAM, a DDR2 SDRM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. The application processor 4100 and the memory module 4200 may be provided as one semiconductor package by being packaged based on a Package on Package (POP).

The network module 1130 may communicate with external devices. The network module 1130 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. The network module 1130 may be included in the application processor 1110.

The storage module 1140 may store data. For example, the storage module 1140 may store data received from the application processor 1110. Alternatively, the storage module 1140 may transmit data stored therein to the application processor 4100. The storage module 1140 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. The storage module 1140 may be provided as a removable drive such as a memory card of the user system 1100 or an external drive.

The storage module 1140 may include a plurality of nonvolatile memory devices, and the plurality of nonvolatile memory devices may operate identically to the nonvolatile memory device 130 described with reference to FIG. 2. The storage module 1140 may operate identically to the storage device 100 described with reference to FIG. 2.

The user interface 1150 may include interfaces for inputting data or commands to the application processor 1110 or outputting data to an external device. The user interface 1150 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 1150 may include user output interfaces such as a Liquid Crystal Display (LCD), an Organic Light Emitting Diode (OLED) display device, an Active Matrix OLED (AMOLED) display device, an LED, a speaker, and a monitor.

In accordance with embodiments of the present disclosure, there can be provided a storage device for efficiently using prefetch data stored in a prefetch data storage, an electronic device including the storage device, and an operating method of the electronic device.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all steps may be selectively performed or part of the steps may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

The embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein and the following claims. Furthermore, the embodiments may be combined to form additional embodiments.

What is claimed is:

1. A storage device comprising:
   a nonvolatile memory device;
   a volatile memory device including:
   a map data storage configured to temporarily store a part of map data representing a relationship between a logical address of data, provided from a host device, and a physical address corresponding to a position in the nonvolatile memory device in which the data provided from the host device is stored; and
   a prefetch data storage configured to store, as prefetch data, map data received from the host device; and
   a memory controller configured to control the nonvolatile memory device and the volatile memory device to process a multi-chunk read command as a read request for at least two logical addresses received from the host device by using the prefetch data, and maintain the prefetch data in the prefetch data storage after data corresponding to the at least two logical addresses is read by using the prefetch data in the prefetch data storage,
   wherein the map data includes a relationship between physical addresses of the nonvolatile memory device, in which data having the at least two logical addresses is stored, and the at least two logical addresses.

2. The storage device of claim 1, wherein the memory controller includes:
   a read operation processor configured to:
   receive the multi-chunk read command,
   acquire the physical addresses corresponding to the at least two logical addresses from the prefetch data,
   read, from the nonvolatile memory device, the data corresponding to the at least two logical addresses, and
   provide read data to the host device; and
   a buffer memory controller configured to control the volatile memory device to maintain the prefetch data in the prefetch data storage after the read operation processor provides the read data to the host device.

3. The storage device of claim 2, wherein the map data about the at least two logical addresses is provided from the host device before the multi-chunk read command is provided from the host device.

4. The storage device of claim 3, wherein the buffer memory controller is further configured to receive a multi-chunk write buffer command including the prefetch data and a read ID from the host device.

5. The storage device of claim 4, wherein the multi-chunk read command includes information on the read ID and the at least two logical addresses.

6. The storage device of claim 2, wherein the read operation processor is further configured to transmit, to the host device, a response message including information representing whether the storage device has processed the multi-chunk read command by using the prefetch data.

7. The storage device of claim 6, wherein the read operation processor is configured to provide the read data to the host device and then transmit the response message to the host device.

8. The storage device of claim 2, wherein the buffer memory controller is further configured to:
determine whether the prefetch data has been changed by over-write, garbage collection, read reclaim, or wear leveling; and
remove the prefetch data when the prefetch data is changed.

9. The storage device of claim 2, wherein the read operation processor is configured to control the nonvolatile memory device to read the data from memory cells indicated by the physical addresses corresponding to the at least two logical addresses.

10. The storage device of claim 2,
wherein the buffer memory controller is configured to control the prefetch data storage to maintain the prefetch data therein after the read operation processor reads the data by using the prefetch data.

11. A host device for controlling a storage device, the host device comprising:
a host buffer configured to store map data representing a relationship between a logical address of data stored in the storage device and a physical address corresponding to a position in a nonvolatile memory device of the storage device in which the data is stored, the map data being provided from the storage device; and
a storage device controller configured to:
transmit, to the storage device, as prefetch data, map data about at least two logical addresses among the map data stored in the host buffer,
transmit, to the storage device, a multi-chunk read command which is a read request for data having the at least two logical addresses, and
receive, from the storage device, a response message including information representing whether the storage device has processed the multi-chunk read command to read the data by using the prefetch data and stored in a volatile memory device of the storage device or without using the prefetch data.

12. The host device of claim 11, wherein the storage device controller is further configured to receive, from the storage device, data which the storage device reads from the nonvolatile memory device by processing the multi-chunk read command.

13. The host device of claim 11, wherein the storage device controller is further configured to transmit, to the storage device, a multi-chunk write buffer command as a write request instructing the storage device to store the prefetch data in the volatile memory device.

14. The host device of claim 13, wherein the multi-chunk write buffer command includes the prefetch data and a read ID.

15. The host device of claim 11, wherein the storage device controller is further configured to retransmit the multi-chunk read command to the storage device when the response message includes information representing that the storage device has processed the multi-chunk read command by using the prefetch data.

16. The host device of claim 11, wherein the storage device controller is further configured to transmit, to the storage device, a multi-chunk read buffer command as a read request for the map data when the response message includes information representing that the storage device has processed the multi-chunk read command without using the prefetch data.

17. A computing system comprising:
a host device; and
a storage device configured to:
receive, from the host device, mapping information for data to be read as prefetch data,
temporarily store the mapping information,
receive, from the host device, a read request for the data,
process the read request by using the mapping information, and
maintain the mapping information therein after data corresponding to the read request is read by using the prefetch data,
wherein the mapping information includes a relationship between a physical address of the storage device, in which the data having a logical address is stored, and the logical address.

18. The computing system of claim 17, wherein the host device is configured to receive, from the storage device, map data representing a relationship between a logical address of data stored in the storage device and a physical address corresponding to a position in a nonvolatile memory device of the storage device in which the data is stored.

19. The computing system of claim 17, wherein the storage device is further configured to provide the host device with information representing whether the storage device has processed the read request by using the mapping information provided from the host device.

20. A storage device comprising:
a nonvolatile memory device;
a map data storage configured to temporarily store a part of map data representing a relationship between a logical address of data, provided from a host device, and a physical address corresponding to a position in the nonvolatile memory device in which the data provided from the host device is stored;
a prefetch data storage configured to store, as prefetch data, map data received from the host device; and
a memory controller configured to control the nonvolatile memory device and the prefetch data storage to:
process a multi-chunk read command as a read request for at least two logic addresses received from the host device by using the prefetch data, and
maintain the prefetch data in the prefetch data storage after data corresponding to the at least two logic addresses is read by using the prefetch data in the prefetch data storage,
wherein the map data includes a relationship between physical addresses of the nonvolatile memory device, in which data having the at least two logical addresses is stored, and the at least two logical addresses.

* * * * *